(12) United States Patent
Pande et al.

(10) Patent No.: US 11,617,311 B2
(45) Date of Patent: Apr. 4, 2023

(54) LIGHT-SELECTIVE MULCH

(71) Applicants: Harshad Pande, Fort Mill, SC (US); Michael A. Bilodeau, Fort Mill, SC (US); Jonathan M. Spender, Fort Mill, SC (US); Jacob John, Fort Mill, SC (US)

(72) Inventors: Harshad Pande, Fort Mill, SC (US); Michael A. Bilodeau, Fort Mill, SC (US); Jonathan M. Spender, Fort Mill, SC (US); Jacob John, Fort Mill, SC (US)

( * ) Notice: Subject to any disclaimer, the term of this patent is extended or adjusted under 35 U.S.C. 154(b) by 474 days.

(21) Appl. No.: 16/627,480

(22) PCT Filed: Jun. 28, 2018

(86) PCT No.: PCT/US2018/040091
§ 371 (c)(1),
(2) Date: Dec. 30, 2019

(87) PCT Pub. No.: WO2019/006167
PCT Pub. Date: Jan. 3, 2019

(65) Prior Publication Data
US 2020/0154649 A1 May 21, 2020

Related U.S. Application Data

(60) Provisional application No. 62/527,503, filed on Jun. 30, 2017.

(51) Int. Cl.
*A01G 13/02* (2006.01)
*C09K 17/52* (2006.01)
*D21H 27/00* (2006.01)
*D21H 19/12* (2006.01)
*D21H 21/32* (2006.01)

(52) U.S. Cl.
CPC .......... *A01G 13/0262* (2013.01); *C09K 17/52* (2013.01); *D21H 19/12* (2013.01); *D21H 21/32* (2013.01); *D21H 27/00* (2013.01)

(58) Field of Classification Search
None
See application file for complete search history.

(56) References Cited

U.S. PATENT DOCUMENTS

| | | |
|---|---|---|
| 4,580,960 A | 4/1986 | Apman et al. |
| 5,672,434 A | 9/1997 | Dalebroux et al. |
| 2002/0129544 A1* | 9/2002 | Bargiacchi ............. C09K 17/52 47/9 |
| 2005/0279019 A1* | 12/2005 | Slanghek ............ A01G 13/0262 47/9 |
| 2009/0056209 A1* | 3/2009 | Baciu ..................... B29D 7/01 264/211.13 |
| 2016/0060814 A1 | 3/2016 | Hauschel et al. |
| 2016/0083651 A1* | 3/2016 | Phillips ................. A01N 47/44 427/212 |
| 2017/0121559 A1 | 5/2017 | Jung et al. |
| 2018/0355248 A1* | 12/2018 | Backfolk ............... D21H 15/10 |

FOREIGN PATENT DOCUMENTS

| | | |
|---|---|---|
| EP | 3168271 | 5/2017 |
| WO | WO 2017/090000 | 6/2017 |
| WO | WO 2017/199157 | 11/2017 |

OTHER PUBLICATIONS

"Lignin Properties", GREENAGROCHEM, [online], no date, retrieved from the Internet, [retrieved Apr. 9, 2022, <URL: https://www.greenagrochem.com/lignin-properties/>. (Year: 2022).*
Partial Supplementary European Search Report Issued in Corresponding European Patent Application No. 18823335.7, dated Feb. 23, 2021.
Extended European Search Report issued in Corresponding European Application No. 18823335.7, dated Jul. 12, 2021.
Imam. et al., "Characterization of Biodegradable Composite Films Prepared From Blends of Poly (Vinyl Alcohol), Cornstarch, and Lignocellulosic Fiber," *Journal of Polymers and the Environment*, 13(1): 17-55, 2005.
International Search Report and Written Opinion Issued in Corresponding PCT Patent Application No. PCT/US2018/040091, dated Jan. 11, 2019.
Isikgor & Becer, "Lignocellulosic Biomass: a Sustainable Platform for the Production of Bio-Based Chemicals and Polymers," Polymer Chemistry 6(25): 4497-4559, 2015.
Sadeghifar, et al., "Cellulose-Lignin Biodegradable and Flexible UV Protection Film," ACS Sustainable Chemistry & Engineering 5.1: 625-631,2016.

* cited by examiner

*Primary Examiner* — Dennis R Cordray
(74) *Attorney, Agent, or Firm* — Choate, Hall & Stewart LLP; Brian E. Reese

(57) ABSTRACT

Lignin formulations for making light-selective mulch, methods of making such lignin formulations, light-selective mulches comprising substrates treated with lignin formulations, and methods of making such light-selective mulches. Some methods involve preparing aqueous lignin formulations that can be used as coatings that, in turn, can be applied to a substrate, such as a paper web, to form a biodegradable, light-selective mulch. Some such mulches blocks at least some light in the ultraviolet and blue/green ranges (350 nm to 500 nm) of the visible light spectrum to inhibit weed growth below the mulch, while also transmitting light in the red/infrared ranges to heat the soil below the mulch.

20 Claims, 1 Drawing Sheet

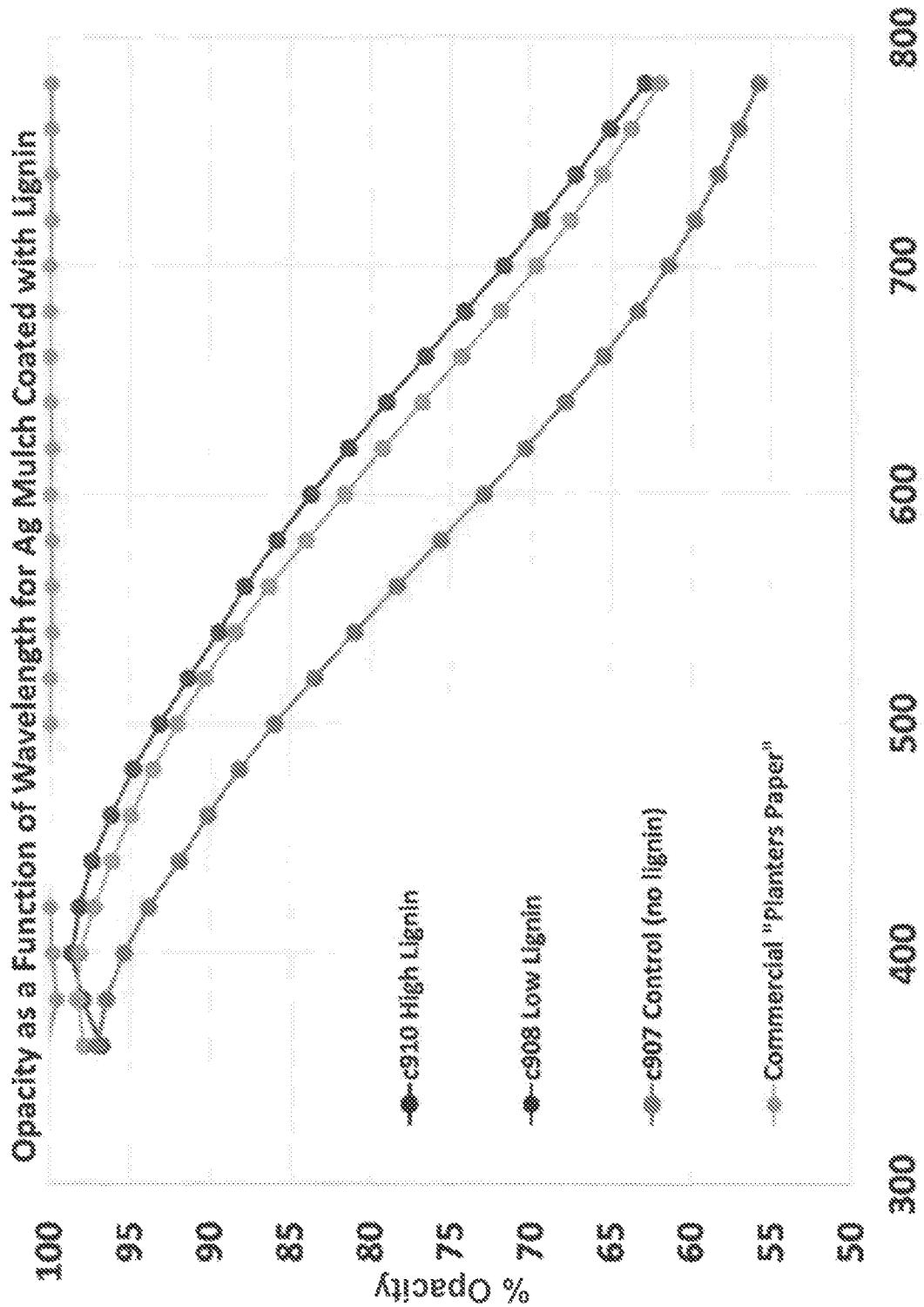

LIGHT-SELECTIVE MULCH

CROSS REFERENCE TO RELATED APPLICATIONS

This Application is a national phase application under 35 U.S.C. § 371 of International Application No. PCT/US2018/040091, filed Jun. 28, 2018, which claims priority to U.S. Provisional Patent Application No. 62/527,503, filed Jun. 30, 2017. The contents of each of the foregoing applications are incorporated herein by reference in their entirety.

FIELD OF INVENTION

The present invention relates generally to light-selective mulches and, more particularly not by way of limitation, to lignin formulations and methods for making light-selective mulches comprising a substrate treated with a lignin formulation.

BACKGROUND

Plastic films are sometimes used in agricultural applications, for example as a mulch to cover the ground around the bases of growing plants. Such films can retain moisture in the soil around the roots of the plants, keep the fertilizers, pesticides, and/or other agents near the plants, inhibit the growth of weeds, and reduce or prevent erosion of soil by rain, wind, and the like. Such a mulching film may, for example, be unrolled and applied lengthwise along a row of seeds or seedlings, or across portions of multiple such rows. One common film used for mulch is polyethylene film, which is generally not biodegradable and must be removed and disposed of after each growing season. This removal increases the cost of using such plastic film as a mulch, and generates waste that typically ends up in landfills and will not degrade for many years. Other types of plastic films used for mulch may degrade and fragment into the soil at the end of the growing season, which typically reduces or eliminates the cost associated with removing the film; however, such degradable films may include additives to accelerate degradation and fragmentation.

Lignin is a naturally occurring, complex organic polymer found in many plants and trees. Lignin can be isolated in commercial quantities from chemical pulp mill cooking liquors. Outside of fuel for commercial boilers, there are relatively few large-volume commercial uses for lignin. In general, lignin has not been widely used as a paper additive due to its insolubility in water and its hydrophobic properties, which are typically incompatible with aqueous fiber slurries and coatings widely used in conventional paper manufacturing processes.

Many modern papermaking machines are based on the principles of the Fourdrinier Machine, which uses a woven-plastic-fabric-mesh conveyor belt in a forming section in which a slurry of fiber (usually wood or other vegetable fibers) is drained to create a continuous paper web. After the forming section the wet web passes through a press section to squeeze out excess water, then the pressed web passes through a heated drying section. The original Fourdrinier forming section used a horizontal drainage area, referred to as the drainage table.

Most modern paper-making machines have four sequential operational sections: a forming section, a press section, a drying section, and a calender section. In the forming section, commonly called the wet end, a slurry of fibers form a wet web of fiber. In the press section, the wet fiber web passes between large rolls loaded under high pressure to squeeze out as much water as possible. In the drying section, the pressed sheet passes a series of steam heated drying cylinders to reduce water content in the web to a level of about 6 wt. %, where it will remain at typical indoor atmospheric conditions. Finally, in the calender section, the dried paper is smoothed under high loading and pressure between one or more "nips," devices that squeezes the sheet between two rollers. Typically, only one nip is needed to hold the sheet, which shrinks through the drying section and is held in tension between the press section and the calender section. Extra nips may provide additional smoothing, but may reduce paper strength to some extent. A size press can be disposed in the drying section between sets of drying cylinders.

SUMMARY

This disclosure includes embodiments of (i) lignin formulations for making light-selective mulch, (ii) methods of making such lignin formulations, (iii) light-selective mulches comprising substrates treated with lignin formulations, and (iv) methods of making such light-selective mulches. For example, certain of the present methods involve preparing aqueous lignin formulations that can be used as coatings that, in turn, can be applied to substrates, such as paper webs, to form a biodegradable, light-selective mulch. Various embodiments address and overcome one or more of the challenges noted above. By way of example, certain embodiments of the present methods overcome the conventional incompatibility of lignin in aqueous coatings by a process of heating the lignin to and/or at a temperature of 180 degrees Fahrenheit (° F.) or higher and a pH of 8.0 or higher in an aqueous mixture to achieve a solids content of 10 wt. % to 20 wt. % or more. This process results in a lignin formulation with properties suitable for use as a coating or sizing formulation for a paper web. Once coated or sized with the lignin formulation, such a paper web exhibits enhanced light selectivity that, when the paper web is used as a mulch, improves weed control and plant yield relative to untreated paper and at least some plastic films, while still permitting the paper web to degrade and fragment into the soil such that the mulch does not need to be removed at the end of each growing cycle.

The term "solids" refers to the non-water or non-solvent components of the formulation. The weight percent of these components is determined by weighing the mass that remains after extracting the water or solvent from the formulation under mild conditions, e.g., evaporation in a 105° C. oven. The "solids" are not necessarily materials in a solid phase suspended in solution. In fact, most often the "solids" in solution are solubilized and thus, they are in the liquid phase.

As used in this disclosure, "lignin formulation" refers to a formulation that includes lignin for the purpose of coating a substrate. In some embodiments, for example, the lignin can be or include one or more of: kraft lignin, which is extracted from black liquor; hydrolytic lignin; lignosulfonates; organosolv lignin; soda lignin; lignin obtained by pre-treatment of lignocellulosic material; and/or any mixture thereof. Such lignins can be chemically, physically, and/or biologically modified. Chemical modification of lignin can include, but is not limited to, the addition of one or more organic functional groups and/or one or more inorganic functional groups. Examples of such organic functional groups include carboxyl groups, carbonyl groups, alkenyl groups, and the like. Examples of inorganic functional groups include sodium groups, sulfate groups, potassium groups, and the like. Physical modification of lignin can include, but is not limited to extraction, milling, and/or grinding. Biological modification of lignin can be performed by biomass degradation, or incubation with microbes or enzymes.

As noted above, the present light-selective mulches can comprise a paper web product coated or sized with one of the present lignin formulations to cause the paper web to differentially transmit different wavelengths of light, i.e., to exhibit light-selective properties. For example, some such treated webs or mulches block at least some portion, for example a majority, of light in the ultraviolet (UV) and blue/green regions of the visible light spectrum, specifically 350 nanometers (nm) to 500 nm, but transmit at least some portion, for example a majority, of light in the red/infrared (IR) range, specifically 650 nm to 1000 nm. This blocking of UV and blue/green light inhibits weed growth, while the transmission of red/infrared light heats the soil below the mulch. Such soil heating can be particularly important during the early part of the growing season, for example, to increase plant yield, for example of fruit- and vegetable-producing plants. The terms "inhibit" and "reduce," and variations thereof, include any measurable decrease or complete inhibition to achieve a desired result. The lignin in the coating imparts opacity in such a way as to reduce transmission in the UV and blue/green region of light, while not reducing or reducing to a lesser degree the transmission of light in the red/IR range.

As noted above, certain embodiments of the present methods include a process of heating the lignin to and/or at a temperature of 180 degrees Fahrenheit (° F.) or higher at a pH of 8.0 or higher in an aqueous mixture to achieve a solids content of 10 wt. % to 20 wt. %, or more, to form a lignin formulation with properties suitable for use as a coating or sizing formulation for a paper web that can be used as a mulch. In some such embodiments, the lignin can be cooked in the presence of and emulsified in polysaccharide(s), for example starch, or polyvinyl alcohol (PVOH) to form a stable emulsion coating that can be applied using conventional paper coating methods. Polysaccharides are polymeric carbohydrate molecules composed of long chains of monosaccharide units bound together by glycosidic linkages and on hydrolysis give the constituent monosaccharides or oligosaccharides. They range in structure from linear to highly branched. Natural saccharides are generally of simple carbohydrates called monosaccharides with the general formula $(CH_2O)n$ in which n is three (3) or more. Examples of monosaccharides include glucose, fructose, and glyceraldehyde. Polysaccharides have a general formula of $C_x(H_2O)_y$ in which x is usually a large number on the order of 200 to 2500. As used herein the term "polysaccharide" refers to a molecule containing more than ten monosaccharide units.

Starch is a natural polysaccharide (a polymer of glucose) in plants, being found in the form of both amylose and the branched amylopectin. Specifically, starch or amylum is a polysaccharide consisting of a large number of glucose units joined by glycosidic bonds. Starch is produced by most green plants as an energy store. It is the most common carbohydrate in many human diets and is contained in large amounts in staple foods such as potatoes, wheat, corn, rice, and cassava. Depending on the plant, starch generally contains 20 wt. % to 25 wt. % amylose and 75 wt. % to 80 wt. % amylopectin.

Polyvinyl alcohol (PVOH, PVA, or PVAl) is a water-soluble synthetic polymer. It has the idealized formula $[CH_2CH(OH)]_n$. It is used in papermaking, textiles, and a variety of coatings. Other compounds that can be included or used as a substitute for PVOH include carboxymethylcellulose, soy protein isolate, and naturally occurring gums like locust bean, guar etc.

Certain embodiments of the present methods involve coating or sizing a light weight biodegradable substrate, such as paper, with a lignin formulation. For example, lignin formulation can be applied to a paper web with a size press. Once coated, the paper web can be used as a biodegradable, paper-based agricultural mulch with improved light absorption characteristics relative to prior art alternatives. For example, prior paper mulches used carbon black to provide opacity (see FIG. 1), but that approach also blocks the red/infrared region and thereby reduces heating of the soil, which can slow plant growth.

One benefit of the present uses of lignin as an opacifying agent for paper is lignin's low cost relative to pigments and dyes previously used to increase the opacity of paper. In addition and in contrast to inorganic pigments such as $TiO_2$, carbon black, and clays that are non-biodegradable, lignin is organic and completely biodegradable. Finally, unlike many synthetic dyes and pigments that raise many concerns when discharged into waterways or soil, lignin is a naturally-occurring organic polymer that poses no known environmental, health, or safety issues when applied to the soil. The compositions of the invention can be used to eliminate or reduce the need for or amounts of undesirable chemicals and/or compounds needed.

Certain embodiments are directed to a light-selective mulch comprising a substrate; and a light selective surface coating that comprises lignin and a polysaccharide or polyvinyl alcohol. The lignin can include at least one lignin selected from the group consisting of kraft lignin, hydrolytic lignin, lignosulfonates, organosolv lignin, and soda lignin. The light-selective surface coating can include a polysaccharide. In certain aspects the polysaccharide includes starch. The light-selective surface coating can include a lignin to starch ratio of 25:1 to 4:1. In certain aspects the light-selective surface coating has a thickness of 0.5 μm to 1 mm. The substrate can include paper. A paper can include fibers having a hardwood fiber to softwood fiber ratio of 9:1, 7:3 to 1:9, 3:7, including all ratios and range of ratios there between. The light-selective surface coating can further include an optical brightening agent. In certain aspects the optical brightening agent is 4,4'-diamino-2,2'-stilbenedisulfonic acid. The light-selective surface coating can further include a salt.

Some embodiments are directed to methods of making a light-selective mulch, the method including the steps of: coating a mulch substrate with a light-selective lignin formulation comprising lignin and starch, or polyvinyl alcohol, the light-selective lignin formulation having a solids content of at least 10 wt. %. The lignin formulation can be an aqueous emulsion. In certain aspects the solids in the lignin formulation include 80 weight % to 95 weight % lignin and 3 weight % to 20 weight % starch or polyvinyl alcohol. In a particular aspect the lignin includes one or more lignins selected from the group consisting of: kraft lignin, hydrolytic lignin, lignosulfonates, organosolv lignin, and soda lignin. The lignin formulation can further include at least one component selected from the group consisting of: water, a salt, and an optical brightening agent.

Still other embodiments are directed to methods for preparing a lignin formulation for coating a mulch substrate, the method including the steps of: (a) adding 5 to 15 grams of lignin and 1 to 4 grams of a polysaccharide, or polyvinyl alcohol per 85 to 90 grams water with agitation to form a mixture; (b) heating the mixture to 170 to 200° F.; (c) incubating the mixture and maintaining pH at 8.0 or greater to form a lignin formulation with a solids content of at least 10 wt. %. In certain aspects the mixture is incubated for at least 2 hours. In certain aspects the lignin to polysaccharide and/or polyvinyl alcohol ratio is 20:1, 15:1, 10:1, 5:1 to 2:1 In other aspects the lignin to starch ratio is 20:1, 15:1, 10:1, 5:1 to 2:1. The pH can be maintained by adding a sodium hydroxide solution.

The terms "a" and "an" are defined as one or more unless this disclosure explicitly requires otherwise.

The terms "substantially" and "about" are defined as largely but not necessarily wholly what is specified (and includes what is specified; e.g., substantially 90 degrees or about 90 degrees each includes 90 degrees), as understood by a person of ordinary skill in the art. In any disclosed embodiment, the term "about" may be substituted with "within ten (10) percent of" what is specified. In any disclosed embodiment, the term "substantially" may be substituted with "within five (5) percent of" what is specified.

The terms "wt. %," "vol. %," or "mol. %" refers to a weight, volume, or molar percentage of a component, respectively, based on the total weight, total volume, or total moles of material in which the component is included. In a non-limiting example, 10 moles of component in 100 moles of the material is 10 mol. % of component.

The use of the term "or" in the claims is used to mean "and/or" unless explicitly indicated to refer to alternatives only or the alternatives are mutually exclusive, although the disclosure supports a definition that refers to only alternatives and "and/or."

The terms "comprise" and any form thereof such as "comprises" and "comprising," "have" and any form thereof such as "has" and "having," "include" and any form thereof such as "includes" and "including," and "contain" and any form thereof such as "contains" or containing," are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

The formulations and methods of making and using the same of the present invention can "comprise," "consist essentially of," or "consist of" particular ingredients, components, blends, method steps, etc., disclosed throughout the specification.

Any embodiment of any of the present formulations and methods can consist of or consist essentially of—rather than comprise/include/have—any of the described components, steps, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The component, components, feature, or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawing forms part of the present specification and is included to further demonstrate certain aspects of the present invention. The invention may be better understood by reference to the drawing in combination with the detailed description of the specification embodiments presented herein.

FIG. 1 illustrates the opacity across a range wavelengths for various examples of the present formulations.

DETAILED DESCRIPTION OF ILLUSTRATIVE EMBODIMENTS

Certain of the present biodegradable, light-selective mulches can be prepared by using a size press, for example in a typical papermaking process, to coat a base substrate or paper web with a lignin formulation to cause the substrate to differentially transmit different wavelengths of light, i.e., light-selectivity.

A. Lignin Formulations and Methods of Making Lignin Formulations

As noted above, the present disclosure contemplates using a lignin formulation in one or more stages of the papermaking process to coat or size a substrate or paper web to form a light-selective mulch. The lignin formulation may, in some embodiments, be in the form of an emulsion or dispersion, and in other embodiments the formulation may be an aqueous-based solution or mixture.

1. Lignin Formulations

Some embodiments of the present lignin formulations can be prepared by adding lignin to water, and applying agitation and heat to cause the lignin to "break apart and wet out." For example, the mixture can be heated to a temperature of 140, 150, 160, 170° F. to 180, 190, 200, 210° F., including all values and ranges there between, for a period of time, for example 1 hour to 2 hours, with the pH at, adjusted to, and/or maintained at 8.0, 8.1, 8.2, 8.3, 8.4, to 8.5, including all values and ranges there between. The mixture can also be stirred periodically or continuously as the mixture is "cooked" in this way. The pH may decrease as the lignin is "cooked" back into solution, but the pH of the mixture can be adjusted back up to 8.0 to 8.5 by adding a base such as sodium hydroxide or the like. The liquid in this process can turn from an earthy brown color to a distinctly more black color, which is desirable for increasing sheet opacity. The lignin can also be cooked in the presence of and emulsified in polysaccharide(s), for example starch, or polyvinyl alcohol (PVOH) to form a stable emulsion coating that can be applied using conventional paper coating methods.

In this way, lignin can be cooked into solution to yield a lignin formulation having solids by weight of about any one of, or between any two of: 10, 11, 12, 13, 14, 15, 16, 17, 18, 19, 20, 21, 22, 23, 24, 25, 26, 27, 28, 29, and/or 30 wt. %. Such solids can comprise one or more lignin(s) at a weight percent of about any one of, or between any two of: 30 wt. %, 40 wt. %, 50 wt. %, 60 wt. %, 70 wt. %, 80 wt. %, and/or 90 wt. %. In some embodiments, the "cooked" lignin formulation can have a viscosity of 50, 100, 150, 200, 250 to 300, 350, 400, 450, 500 cps, including all values and ranges there between, at 100° F. In certain aspects the viscosity can be determined using a Brookfield viscometer. While some of the lignin stays suspended, a certain amount can settle out without agitation. Nevertheless, the settled lignin is easily re-dispersed and usable as a coating even after storage for a period of time, e.g., a week or longer. Increasing solids contents can increase opacity, especially in the UV ranges of light, which helps inhibit weed growth.

In addition to one or more lignin(s), the solids can comprise starch and/or PVOH, or a combination of one or more lignin(s) as well as starch and/or PVOH. The solids in some of the present lignin formulations can comprise, e.g., one or more lignin(s), a polysaccharide such as a starch, and PVOH. For example, the solids can comprise 60 wt. % to 90 wt. % lignin(s) and 10 wt. % to 40 wt. % polysaccharide and/or PVOH, such as 5 wt. % to 20 wt. % of each of polysaccharide and PVOH. In certain aspects the solids comprise the minimal amount of starch needed for suspension of lignin in a particular coating.

Some of the present lignin formulations also include additional chemicals or additives, such as may be used conventional size press formulations, such as silica or other fillers, optical brightening agents, defoamers, biocides, salts, and any combination thereof. Optical brightening agents (OBAs) are chemical compounds that absorb light in the ultraviolet and violet region (usually 340-370 nm) of the electromagnetic spectrum, and re-emit light in the blue region (typically 420-470 nm) by fluorescence. The most common classes of compounds with this property are the stilbenes, e.g., 4,4'-diamino-2,2'-stilbenedisulfonic acid. Examples of salts include sodium chloride or calcium chloride.

The pH of the lignin formulation is typically a basic pH and is not necessarily limited to any specific basic pH or pH range. In some embodiments, the pH of the lignin formulation added at the size press is 8.0 or greater.

While examples described above are aqueous or water-based, some of the present lignin formulations are instead hydrocarbon-based or organic solvent-based. By way of further example, some of the present lignin formulations are in emulsion form, for example, water-in-oil, oil-in-water, or the like. Some of the present lignin formulations can also include conventional sizing agents.

2. Fibrous Substrate

In some of the present embodiments, the substrate to be coated is a fibrous substrate, such as a paper web, comprising fibers. The fibers can be bleached or unbleached fibers. In some embodiments, the fibers can comprise a hardwood fiber (HWD), soft wood fiber (SWD), or a HWD/SWD fiber mixture. Such a HWD/SWD mixture can have a ratio of HWD to SWD of about any one of, or between any two of: 90:10, 80:20, 70:30, 60:40, 50:50, 40:60, 30:70; 20:80; to 10:90, including all ratios and range of ratios there between. For example, in some embodiments, the HWD to SWD ratio is substantially 70:30. The HWD and/or SWD can, for example, be independently refined to 150 to 550 Canadian Standard Freeness (CSF), including all values and ranges there between. The freeness of pulp or Canadian Standard Freeness (CSF) is a measure of the rate at which a dilute suspension of pulp (3 g of pulp in 1 L of water) may be drained. The freeness, or drainage rate has been shown to be related to the surface conditions and swelling of the fibers. Besides these factors, the result is dependent also on conditions under which the test is carried out, such as stock preparation, temperature, and water quality.

B. Methods of Making Light-Selective Mulch

The present methods of making light-selective mulch can use conventional papermaking processes, which can be practiced on conventional papermaking equipment. Although papermaking equipment varies in operation and mechanical design, the processes by which paper is made on different equipment contain common stages. For example, papermaking typically includes a pulping stage, a bleaching stage, a stock preparation stage, a wet end stage and a dry end stage.

In the pulping stage, individual cellulose fibers are liberated from a source of cellulose by mechanical and/or chemical action. The pulp is suspended in water in the stock preparation stage. The wet end stage of the papermaking process comprises depositing the stock suspension or pulp slurry on the wire or felt of the papermaking machine to form a continuous web of fibers, draining of the web, and consolidation of the web or "pressing" to form a sheet. In the dry end stage of the papermaking process, the web is dried and may be subjected to additional processing, like passing the dried web through a size press, calendering, coating, printing, cutting, corrugating, and the like. In addition to using a size press, the dried paper can be coated.

A typical papermaking machine includes components such as a dryer, a calendering system, and a surface sizing system. The surface sizing system comprises a size press which applies surface sizing agents or other compounds, such as a lignin formulation or coating of the invention, to the surface of the paper. Generally, a size press applies various solutions or formulations to the surface of paper. The paper may have been dried or partially dried before treatment by the size press. The size press may add a formulation or solution of chemicals, such as surface sizing agents, to the paper using, for example, a puddle and nip between rolls or by metering the solution onto a rubber roll.

In some embodiments, the lignin formulation is applied to the substrate as a surface treatment to one or two sides of the substrate. For example, if the substrate is a paper web, the lignin formulation may be applied to one side of the paper or both sides of the paper. In general, the lignin formulation can applied at or near the size press, although the formulation can alternatively or additional be applied at other locations in the papermaking process. In most instances, the size press is situated downstream of a first drying section. The lignin formulation may be applied using conventional size presses, although other components/techniques (e.g., spraying, doctor bar, or other conventionally used coating equipment) may be used to apply the lignin formulation. The coating or sizing of the lignin formulation on the substrate can have a thickness of about or substantially any one of, or between any two of: 0.25 µm, 2.5 µm, 25 µm, 250 µm, 1 mm, 1.25 mm, 1.5 mm, 1.75 mm, and/or 2 mm.

As described above, the present lignin formulations can be used to coat or size a substrate to form a light-selective mulch. The coating or sizing functions by transmitting more of certain wavelengths of sunlight, for example in the range of 700 nm to 1 mm, than it does of other wavelengths of light, for example in the range of 350 nm to 500 nm. Wavelengths in the range of less transmission, in this example in the range of 350 nm to 500 nm, may be partially or entirely blocked or reflected. In general, transmitted wavelengths of sunlight can warm the soil and the blockage and/or refection of other wavelength of sunlight can deprive weeds and undesirable plants of an essential energy source.

In some embodiments, after the substrate is coated with lignin, for example, in a size press, an additional coating, for example an oil- or wax-based coating, can be added to improve durability and slow degradation in use. For example, a pilot coater can be used to apply a soya and linseed oil-based coating. In some instances, different additional coatings can be applied to different sides of the substrate. For example, if one side is coated with soya and linseed oil-based coating, the other side can be coated with PVOH, for example also using a pilot coater. The total coating weight can be between 4 gsm and 10 gsm, for example between 6 gsm and 8 gsm, per side of the substrate, and may be the same or different between sides.

C. Methods of Using a Light-Selective Mulch

The present methods using a light-selective mulch can include growing plants with a light-selective mulch. For example, one of the present light-selective mulches can be placed over soil, for example after the soil has been prepared. Soil can be prepared in any of various ways, such as, for example, by tilling or adding fertilizer, a fumigant, an insecticide, a pesticide, and/or other agent. Some embodiments of the present methods include one or more such preparation steps. The light-selective mulch can, for example, be anchored in place using conventional techniques like stakes or the weights. In some embodiments, anchoring is accomplished by covering edges of the light-selective mulch with soil. Plants can then be planted in the soil under the light-selective mulch. For example, plants may be planted through slits cut in the mulch, which slits then permit the desired plants to grow upward through the slits while the remainder of the mulch inhibits or prevents other, undesirable plants from growing.

The light-selective mulch can be left in place for substantially an entire growing season. As described above, the light-selective mulch inhibits and/or reduces weeds, retains moisture in the soil, and controls temperature. When the growing season is completed, the plants can be harvested using conventional techniques. The light-selective mulch can be removed and discarded or saved for further use; or can be left to degrade and decompose in the soil.

EXAMPLES

The following examples as well as the FIGURE are included to demonstrate certain examples of the present embodiments and/or characteristics thereof. It should be appreciated by those of skill in the art that the techniques disclosed in the examples or figures represent techniques discovered that function well in the practice of certain embodiments. However, those of skill in the art should, in light of the present disclosure, appreciate that many changes can be made in the specific embodiments which are disclosed and still obtain a like or similar result without departing from the spirit and scope of the invention.

Example 1

A Lignin supplied by Domtar Paper Company was added to water with enough agitation and heat applied to get the lignin to "break apart and wet out". The mixture was heated to 190-200° F. for 2 hours with stirring and the pH was adjusted to 8.5. As the lignin was "cooked" back into solution the pH of the mixture would drop, so on several occasions over the period of an hour, sodium hydroxide was added to re-adjust the pH back up to 8-8.5. The liquid turned from an earthy brown color to a distinctly more black color, which is typically desirable for increasing sheet opacity. The lignin was obtained in solution at elevated pH, and considered to be advantageous relative to alternative acid washed-and-dried lignin. Enough lignin was cooked into solution to yield a 15 wt. % solids coating that had a viscosity of 110 cps at 100 rpm using a Brookfield viscometer. Subsequent labwork showed that the Domtar lignin can be "cooked" to increase solids up to 25 wt. % before observing significant increases in viscosity. While some of this lignin stays suspended, a significant amount will eventually settle out without agitation. Nevertheless, it is easily re-dispersed and is usable as a size press coating even after storage for a week (possibly much longer).

SEPF was also made with unbleached HWD. SEPF was applied in three dosages of 5 wt. %, 10 wt. %, and 15 wt. %. Target GSM without size press application was 42 gsm (grams per square meter).

Lignin and PVOH mixture was applied at a size press. The ratio of Lignin:PVOH was varied from 4:1 to 10:1, while the pickup varied from 90 lbs/t to 180 lbs/t. The opacity data indicated that Lignin:starch/polyvinyl alcohol (PVOH) ratio of 10:1 gives higher opacity in the UV region. Optimization was done for % solids and pH. Offline coating on a pilot coater was done using a soya and linseed oil based coating on one side and PVOH on the other. Total coat weight was about 6 gsm on one side and 8 gsm on the other.

Final porosity after coating of a paper web was around 20,000-34,000 sec compared to a control sheet of uncoated paper web, which was around 11,000 sec. Strength of the base paper was also higher with 10 wt. % SEPF and Lignin:PVOH ratio of 10:1 at size press.

It is contemplated that increasing solids, and therefore pick-up may give even greater opacity if needed, and that greenhouse tests can be used to determine the weed inhibition and degradation rates.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and lignin formulations are not intended to be limited to the particular forms disclosed. Rather, they include all modifications and alternatives falling within the scope of the claims, and embodiments other than the ones described may include some or all of the features of the described embodiments. Further, where appropriate, aspects of any of the embodiments or example described above may be combined with aspects of any of the other embodiments or example described to form further embodiments or examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A light-selective mulch comprising:
   a substrate;
   a light-selective surface coating that comprises:
      lignin; and
      polysaccharide or polyvinyl alcohol; and
   a second coating disposed on one side of the substrate;
   wherein the second coating comprises an oil- or wax-based coating and is different from the light-selective surface coating;
   wherein the light-selective mulch is configured to block a portion of light within a first light spectrum, and to transmit a portion of light within a second light spectrum; and
   wherein the first light spectrum ranging from 350 nanometers (nm) to 500 nm, and the second light spectrum ranging from 650 nm to 1000 nm.

2. The light-selective mulch of claim 1, where the lignin comprises at least one lignin selected from the group consisting of: kraft lignin, hydrolytic lignin, lignosulfonates, organosolv lignin, and soda lignin.

3. The light-selective mulch of claim 1, where the light-selective surface coating comprises polysaccharide, and the polysaccharide comprises starch.

4. The light-selective mulch of claim 3, where the light-selective surface coating comprises a lignin to starch ratio of 25:1 to 4:1.

5. The light-selective mulch of claim 1, where the light-selective surface coating has a thickness of 0.5 µm to 1 mm.

6. The light-selective mulch of claim 1, where the substrate comprises paper.

7. The light-selective mulch of claim 6, where the paper comprises fibers with a hardwood fiber to softwood fiber ratio of 9:1, 7:3, 1:9, or 3:7.

8. The light-selective mulch claim 1, where the light-selective surface coating further comprises an optical brightening agent.

9. The light-selective mulch of claim 8, where the optical brightening agent is 4,4'-diamino-2,2'-stilbenedisulfonic acid.

10. The light-selective mulch of claim 1, where the light-selective surface coating further comprises a salt.

11. The light-selective mulch of claim 1,
wherein the second coating comprises the oil-based coating.

12. A method of making a light-selective mulch, the method comprising:
coating a mulch substrate with a light-selective lignin formulation comprising lignin and starch or polyvinyl alcohol, the light-selective lignin formulation having a solids content of at least 10 weight %; and
coating one side of the mulch substrate with a second coating;
wherein the second coating comprises an oil- or wax-based coating and is different from the lignin formulation;
wherein the light-selective mulch is configured to block a portion of light within a first light spectrum, and to transmit a portion of light within a second light spectrum; and
wherein the first light spectrum ranging from 350 nanometers (nm) to 500 nm, and the second light spectrum ranging from 650 nm to 1000 nm.

13. The method of claim 11, where the lignin formulation is an aqueous emulsion.

14. The method of claim 12, where the solids in the lignin formulation comprise 80 weight % to 95 weight % lignin and 3 weight % to 20 weight % starch or polyvinyl alcohol or a combination thereof.

15. The method of claim 12, where the lignin comprises one or more lignins selected from the group consisting of: kraft lignin, hydrolytic lignin, lignosulfonates, organosolv lignin, and soda lignin.

16. The method of claim 12, where the lignin formulation further comprises at least one component selected from the group consisting of: water, a salt, and an optical brightening agent.

17. A method for preparing a lignin formulation for coating a mulch substrate, the method comprising
(a) adding 5 to 15 grams of lignin and 1 to 4 grams of a polysaccharide or polyvinyl alcohol per 85 to 90 grams water with agitation to form a mixture;
(b) heating the mixture to 170 to 200° F.;
(c) incubating the mixture and maintaining pH at 8.0 or greater to form a lignin formulation with a solids content of at least 10 weight %.

18. The method of claim 17, where the mixture is incubated for at least 2 hours.

19. The method of claim 17, where the lignin to starch ratio is 20:1 to 2:1.

20. The method of claim 17, where the pH is maintained by adding a sodium hydroxide solution.

* * * * *